United States Patent [19]

Wolf

[11] Patent Number: 5,203,672
[45] Date of Patent: Apr. 20, 1993

[54] WIND TURBINE WITH STATIONARY VERTICAL SUPPORT TOWER AND AIRFLOW-DIRECTING SHELL

[75] Inventor: Randolph J. Wolf, Monument, Colo.

[73] Assignee: Mariah Electric Corporation, Monument, Colo.

[21] Appl. No.: 733,039

[22] Filed: Jul. 22, 1991

[51] Int. Cl.⁵ ............................................. F01B 15/06
[52] U.S. Cl. ..................................... 415/2.1; 415/4.1; 415/4.4; 415/907; 416/131; 416/132 B
[58] Field of Search .................... 415/2.1, 4.1, 4.2, 4.4, 415/905, 907; 416/131, 132 B

[56] References Cited

U.S. PATENT DOCUMENTS

| | | | |
|---|---|---|---|
| 2,818,124 | 12/1957 | Johnston | 416/131 |
| 4,012,163 | 3/1977 | Baumgartner | 415/907 |
| 4,449,053 | 5/1984 | Kutcher | 416/132 B |
| 4,474,519 | 10/1984 | Kinsey | 415/4.4 |
| 5,062,765 | 11/1991 | McConachy | 416/132 B |

FOREIGN PATENT DOCUMENTS

| | | | |
|---|---|---|---|
| 2300233 | 2/1975 | France | 416/132 B |
| 153870 | 12/1980 | Japan | 416/132 B |

Primary Examiner—Edward K. Look
Assistant Examiner—Mark Sgantzos
Attorney, Agent, or Firm—Beaton & Swanson

[57] ABSTRACT

A wind turbine with a stationary tower and a set of turbine blades rotatably attached to the top and bottom of the tower. A set of upper and lower braces connects the turbine blades to prevent any sag or skewing of the turbine blades as they rotate about the tower. The wind turbine may also include a stationary shell attached to the tower and inside the sweep of the turbine blades, to direct the airflow toward the turbine blades at the shell periphery, thereby improving overall performance and efficiency of the turbine.

22 Claims, 6 Drawing Sheets

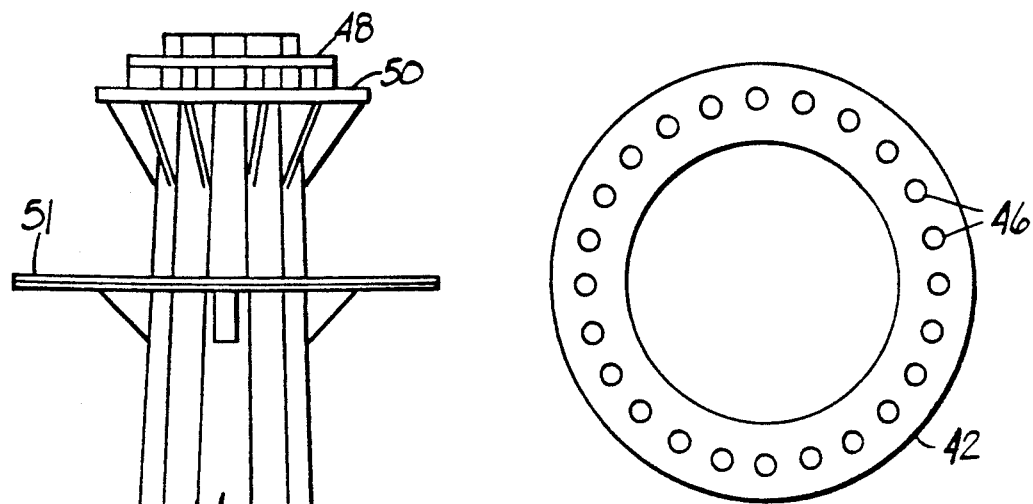
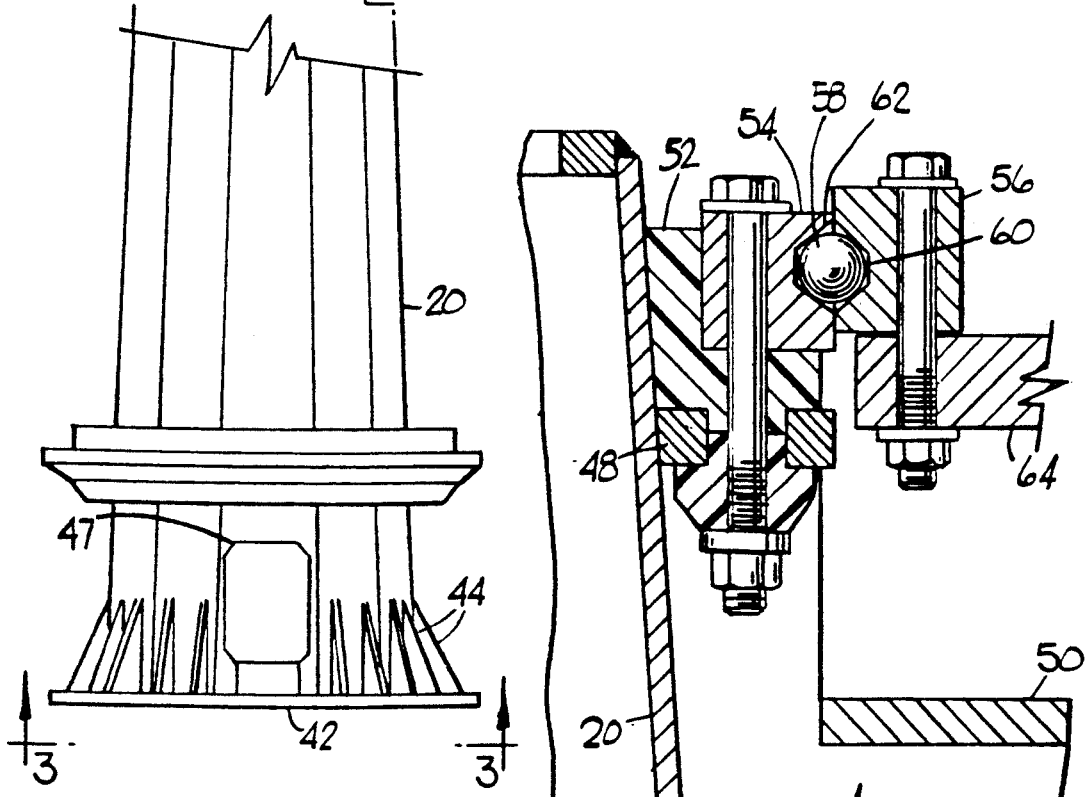

WIND TURBINE WITH STATIONARY VERTICAL SUPPORT TOWER AND AIRFLOW-DIRECTING SHELL

BACKGROUND OF THE INVENTION

This invention relates generally to wind-driven electric power generators, and particularly to a wind turbine having a stationary center vertical support. The invention may also include a shell around which the turbine blades rotate for increasing the wind velocity and air density on the turbine blades, thereby improving overall performance.

Using the energy of the wind for various purposes such as grinding grain and pumping water is a very old idea. More recently, the wind has been harnessed by wind turbines to drive electric generators. The advantages of wind turbines for generating electricity include the fact that the wind itself is cost-free and that the generation process results in no undesirable pollutants such as smoke, radioactivity, chemical waste, or heat.

It is generally recognized that one of the most effective wind turbines for generating electricity are of the Darrieus type in which the turbine blades describe a circular oval shape. The turbine blades are supported by a center vertical post that extends from the base to the top of the apparatus. The turbine blades are arced so that the bottom is attached to the bottom of the center post and the top is attached to the top of the center post and the portion between the top and bottom arcs away from the tower to intercept the wind. The attachments between the tower and the blades are rigid, so that the entire apparatus of center tower and several turbine blades rotates in unison about a vertical axis corresponding to the center tower longitudinal axis. The Darrieus-type design is described further in U.S. Pat. No. 1,835,018 by Darrieus, the contents of which are hereby incorporated by reference.

The ordinary Darrieus design has several problems related to the rotating center tower. One is the cost of the center tower itself. A cost effective Darrieus type turbine is huge—one to two hundred feet tall or more. Further, the turbine blades move quite fast—200 miles per hour or more at the points farthest from the center axis. For the center tower to have the structural ability to rotate, it must be massive. This massiveness results in a very expensive center tower. It also requires a high strength specialized bearing surface at the base to rotatably support the enormous load of the tower and blades. Finally, it adds much to the angular momentum of the entire apparatus and may make it more difficult to control and construct.

SUMMARY OF THE INVENTION

The present invention overcomes these problems by employing a stationary tower. The set of turbine blades are rotatably attached to the stationary tower using bearing means that are more conventional and less expensive than those required for a rotating tower.

It was found that the use of a stationary tower may allow the set of turbine blades to sag or become angularly skewed, thereby allowing the apparatus to deviate from the configuration of optimum effectiveness. This problem has been solved with a novel system of tying together the turbine blades with a set of low profile tubular braces that minimally interfere with the air flow on the turbine blades.

A related aspect of the invention is a system for enhancing the air flow past the turbine blades. An oval, spherical or other appropriately shaped shell is mounted to the stationary tower. The shell directs the air flow away from the center of the apparatus and toward the periphery at the sweep of the turbine blades, thereby increasing the velocity and, to some extent, the density of the air flowing past the turbine blades. This results in a significant performance improvement.

BRIEF DESCRIPTION OF THE DRAWINGS

FIG. 2 shows an elevational view of the stationary tower of the invention.

FIG. 3 shows a bottom view of the stationary tower of the invention, from line 3—3 of FIG. 2.

FIG. 4 shows an elevational view of a detail of the arrangement for the upper attachment of the turbine blades to the stationary tower of the invention.

DESCRIPTION OF THE PREFERRED EMBODIMENT

Figure 1:
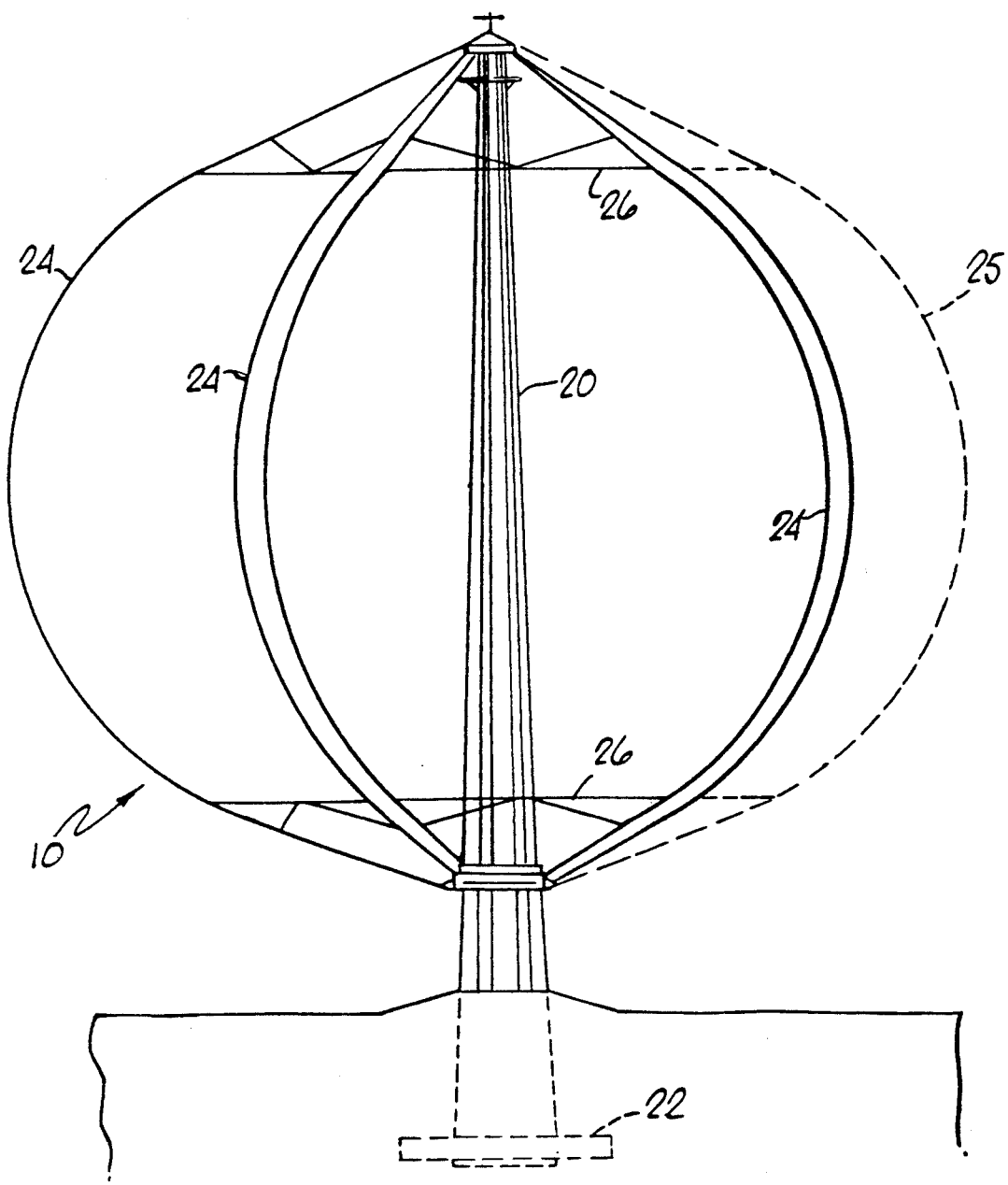
FIG. 1 shows an elevational view of the wind turbine of the present invention.

FIG. 1 shows an elevational view of the wind turbine of the present invention 10. The main components include a stationary center tower 20 which is mounted to a supporting foundation 22. The tower 20 has a set of several (five in this embodiment, the back two of which are obscured by the front two) turbine blades 24 rotatably attached to and spaced equidistantly around the tower 20, the rotation of which describes a roughly spherical shape 25. The turbine blades 24 are interconnected with bracing 26. The apparatus 10 is described in more detail below, beginning with the tower 20.

Referring to FIGS. 2 and 3, the tower 20 is a hollow polygonal tower constructed of welded ⅛ inch mild steel or some other appropriate relatively rigid material. The tower is 12-sided in the preferred embodiment, but other numbers of sides are also acceptable, although it has been found that the number of sides should not be an integral multiple of the number of blades in order to avoid harmonic vibration problems. The bottom of the tower 20 is welded to a ring-shaped bottom flange 42 and supported on the bottom flange by a set of triangular-shaped lower gussets 44 extending from the lower portion of the tower 20 outer surface to the top of the bottom flange 42. The bottom flange 42 may include a set of attachment holes 46 for removably attaching the tower 20 to the supporting foundation 22 (see FIG. 3)

with large bolts (not shown) or other attachment means. The tower 20 may have other configurations that will be apparent to those skilled in the art in view of the descriptions herein, such as a set of tubular members joined at the top and spread at the bottom.

The lower portion of the tower 20 may also include a door 47 to access the hollow interior. In the hollow interior may be a set of ladders and scaffolds to climb up to the top of the interior to service the upper portion through an upper door.

The upper portion of the tower 20 has a first upper tower flange 48 and a second upper tower flange 50 that are around the tower upper periphery and are attached to the tower by a set of upper gussets 52 as shown in FIG. 2. The upper section of the tower 20 may also include a catwalk 51 extending around the tower. The second upper tower flange 50 provides additional structural integrity for the tower 20 and also provides a support mechanism for servicing the bearing attached to the upper flange 48 without having to remove the blades.

As shown in FIG. 4, the first upper tower flange 48 is for attachment of the set of turbine blades 24 (in FIG. 1). Bolted to the top of the first upper tower flange 48 may be a bearing cushion 52 made of cast urethane or an equivalent durable and resilient material. The bearing cushion 52 is L-shaped in cross section and covers the top of the first upper tower flange 48 and a part of the tower exterior surface. An inner bearing housing 54 nests into the bearing cushion 52 and mates with an outer bearing housing 56. The inner bearing housing 54 and outer bearing housing 56 have raceways 58 and 60, respectively, that run completely around the housings and contain a set of roller bearings 62. The outer bearing housing 56 is bolted to the flanges 64 of the set of turbine blades 24 (in FIG. 1), and the flanges are attached to the turbine blades themselves.

Figure 5:
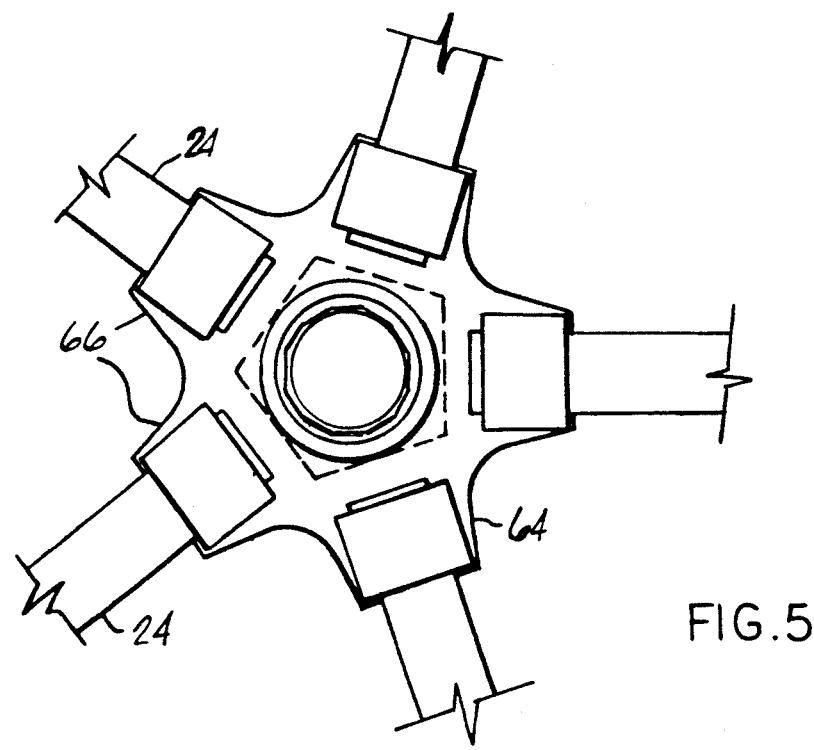
FIG. 5 shows a top view of the turbine blade upper attachment flange and the upper portions of the turbine blades.

The turbine blade upper attachment flange 64 is shown in FIG. 5. It is generally a multisided flange with a set of blade attachment brackets 66 spaced equidistantly around it for receiving the turbine blades 24. The blade attachment brackets 66 are paired so that each pair constitutes an envelope to receive and retain a turbine blade 24. The radially outer ends of each pair may be sloped downward to make a smooth transition between the flange and the arc of the blades. The pairs of blade attachment brackets retain the turbine blade 24 by clamping onto it with a set of bolts passing through the brackets (not shown).

Figure 6:
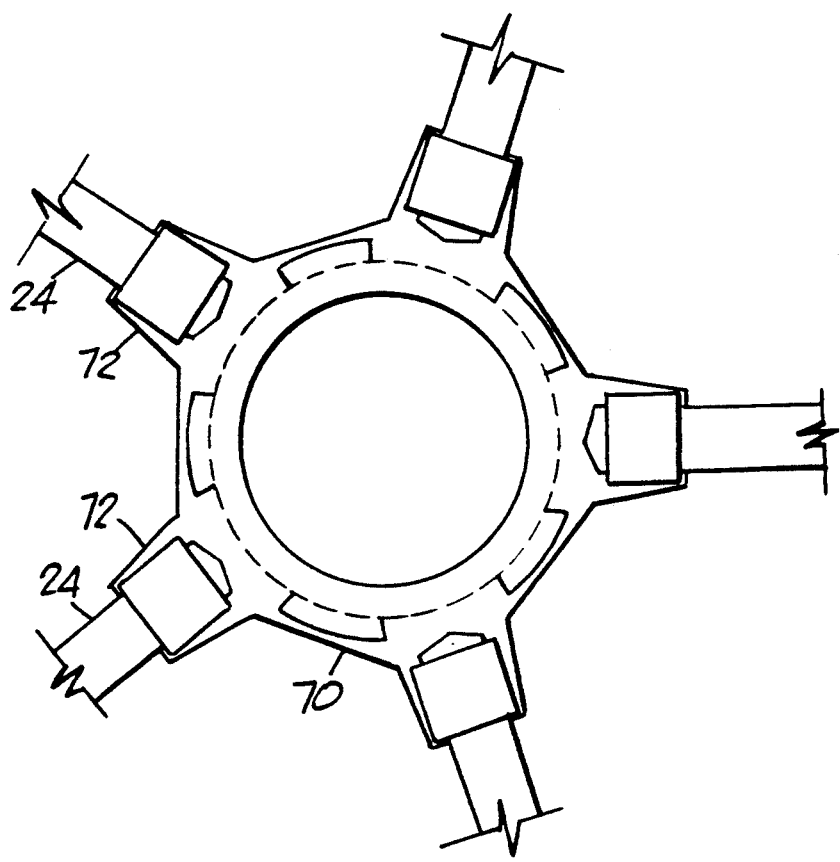
FIG. 6 shows a bottom view of the turbine blade lower attachment flange and the lower portion of the turbine blades.

The turbine blade lower attachment flange 70 is similar to the turbine blade upper attachment flange 64, and is shown in FIG. 6. It is a multisided flange with a set of blade attachment brackets 72 spaced equidistantly around it for receiving the lower end of the turbine blades 24. The radially outer ends of each pair may be sloped upward to make a smooth transition between the flange and the lower ends of the blades 24.

Figure 7:
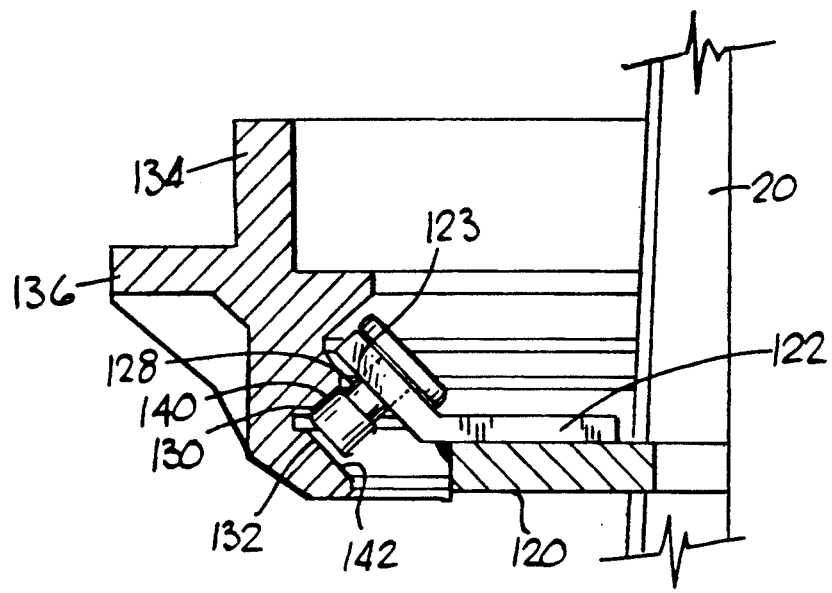
FIG. 7 shows an elevational view of a detail of the arrangement for the lower attachment of the turbine blades to the tower.
Figure 8:
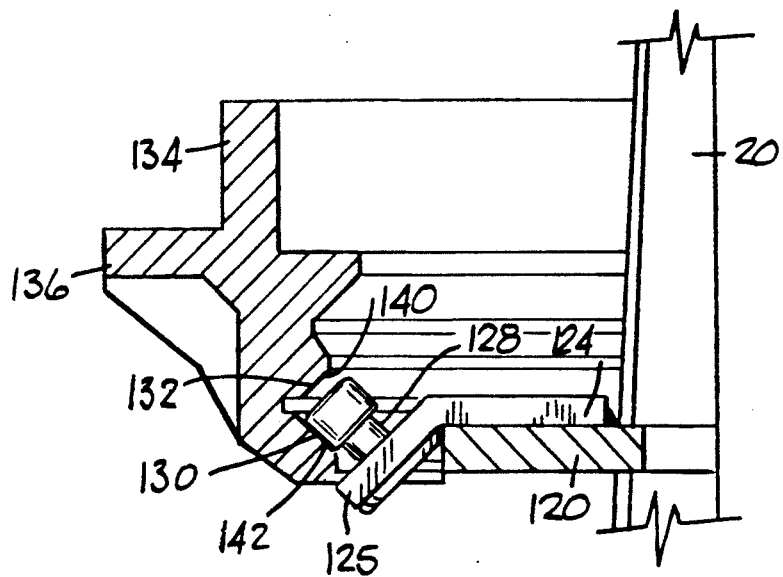
FIG. 8 shows another elevational view of a detail of the arrangement for the lower attachment of the turbine blades to the tower.

The turbine blade lower attachment flange is attached to the lower portion of the tower as shown in FIGS. 7 and 8. A lower flange 120 is attached to and extends around the lower portion of the tower 20. The lower tower flange 120 has attached to it a set of roller bearing tabs 122 and 124 so that the tabs extend around the tower 20. Each tab 122 and 124 extends radially outward from the tower. A first set 122 alternates with a second set 124 as shown in FIGS. 7 and 8. The first set extends upward at its radially outer portion 123 and the second set extends downward at its radially outward portion 125. As can be seen from FIGS. 7 and 8, the configuration is such that a tab with a single design can be used for both the one with the upwardly extending portion 122 and the one with the downwardly extending portion 124, by merely turning it over.

A hole extends through the upwardly extending portion and downwardly extending portion of the tabs 122 and 124, respectively, which receives a bearing shaft 128. Attached to the bearing shaft 128 is a roller bearing 130. The roller bearing 130 rides on an annular raceway 132 in the inner surface of a circular bearing housing 134 which mates with the lower tower flange tabs 122 and 124 described below. Extending radially outward from the bearing housing 134 is a bearing housing blade attachment flange 136 for attachment to the turbine blade lower attachment flange 70 (FIG. 6).

Referring again to FIGS. 7 and 8, it can be seen that the bearing housing raceway 132 has a V-shaped cross-section with an upper raceway 140 and a lower raceway 142. The upper raceway 140 receives the roller bearing 130 of the set of tabs 122 that have an upwardly extending radially outer portion 123, while the lower raceway 142 receives the roller bearing 130 of the set of tabs 124 that have a downwardly extending radially outer portion 125. In this Way, the roller bearings 130 support the bearing housing 134 radially and upwardly and downwardly while still allowing rotation of the bearing housing 134 with respect to the tower 20.

The turbine blades 24 have an ordinary symmetrical airfoil cross-sectional shape that is well-known in the art. However, because the blades extend out from the tower 20 as shown in FIG. 1, the airspeed along the length of the blades varies from a minimum at the points of attachment to the upper and lower blade attachment flanges 64 and 70 to a maximum at a point the maximum distance from the tower (roughly half way up the length of the blades). In order to optimize the performance of the blades, the preferred embodiment may vary the shape of the air foil along the length. The blade shown includes two center portions with a first airfoil shape and two end portions with a second air foil shape. The exact shape will depend on expected wind conditions at the installation site. The construction of the blades is generally known in the art. Commercially available extended aluminum sections have been found to be suitable. The precise lengths of the four portions of each blade will depend in part, of course, on the overall length chosen for the blade. In a preferred embodiment with a blade length of 190 feet, it has been found that 55 feet may be appropriate for each of the two center portions and 40 feet may be appropriate for each of the two end portions.

The arc of the blades as they extend from the top to the bottom of the tower is very important because it defines the area swept by the blades. In the preferred embodiment, the blades 24 approximately define a sphere as they rotate about the tower. If the blades 24 are each 190 feet long, then the width of a sphere defined by the rotating blades will be roughly 146 feet. Of course, other blade configurations may also be used.

Figure 9:
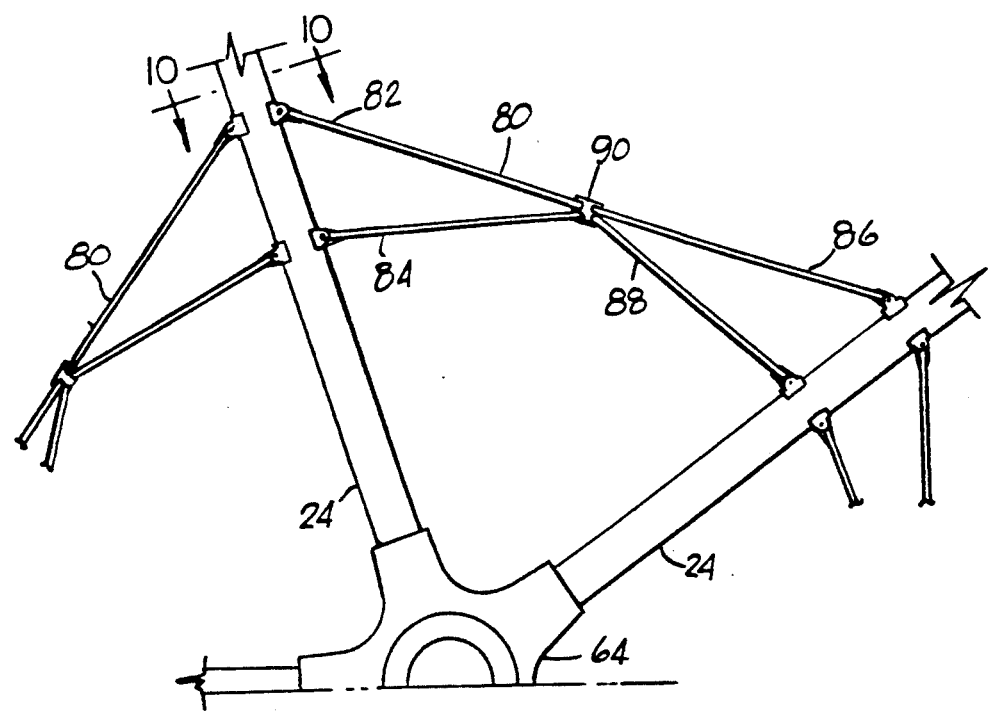
FIG. 9 shows a top view of a portion of some of the turbine blades and the turbine blade bracing.
Figure 10:
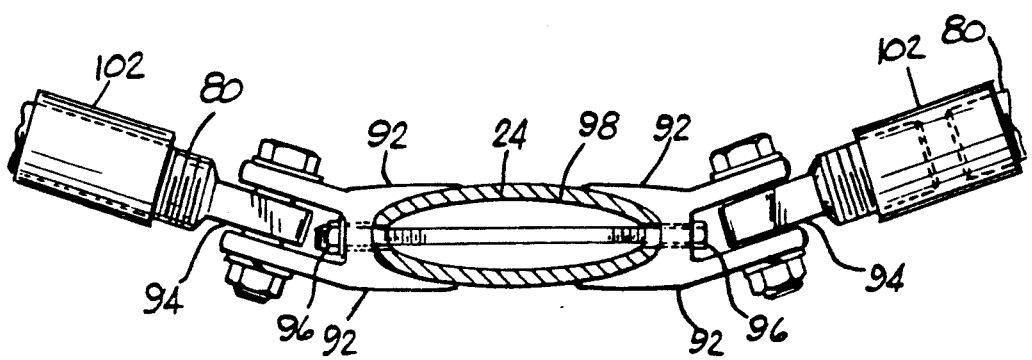
FIG. 10 shows a partial sectional view of the brackets that attached the turbine blade bracing to the turbine blades, taken along line 10—10 of FIG. 9

The bracing system for the upper half of the turbine blades 24 is shown in FIG. 9 and more particularly in FIG. 10. The bracing system for the lower half is essentially the same as for the upper half. Each blade 24 is tied to each of the two adjacent blades with a set of braces 80. The brace set 80 includes four individual braces, 82, 84, 86 and 88 which are joined at a brace gusset 90 midway between each pair of adjacent blades.

The braces are tubular metal such as steel or aluminum which may be flattened or have an airfoil shape to lessen the wind profile. They are welded to the brace gusset 90.

The ends of the braces opposite the gusset 90 are attached to the blades 24 through brace attachment brackets 92 which are shown in more detail in FIG. 10. In the preferred embodiment, the brackets include two tabs 95 that extend over and under the blade 24 and a slot 94 for receiving the brace 80. Retaining bolt holes are included in a shoulder 96 between the tabs and slot to receive retaining bolts 98. The retaining bolts 98 extend through the holes and through extending holes in the blade and then through a mating brace attachment bracket on the opposite side of the blade. In this way, a single set of bolt holes through the blades 24 serves to mount two brace attachment brackets—one for each side. Each brace 82, 84, 86 and 88 has a turnbuckle 102 at one end, preferably the end at a blade trailing edge, which is of conventional turnbuckle design. By tightening or loosening the turnbuckle, the tension in the brace can be increased or decreased. Because the blades are somewhat flexible, this adjustment of the brace tension will adjust the arc of the blades, which may be desirable for varying operating conditions.

Figure 11:
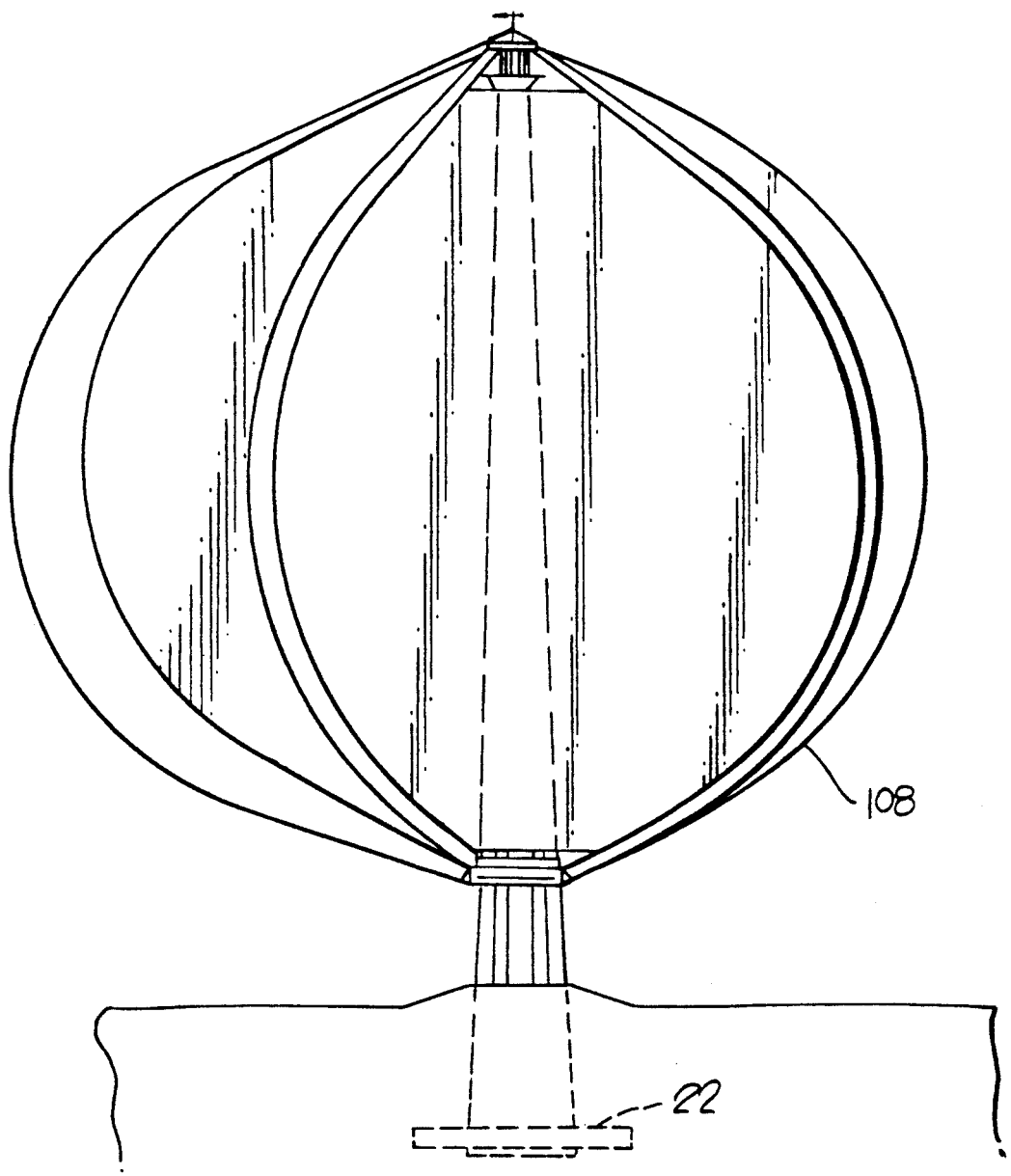
FIG. 11 shows an elevational view of another embodiment of the present invention.

The turbine system may also include an air flow directing shell 108 as shown in FIG. 11. The shell is a hollow roughly spherical element attached at the top and bottom to the stationary tower 20. The shell 108 is somewhat smaller than the sphere described by the rotating turbine blades 24, so that the shell channels air away from the center of the apparatus and toward the periphery that lies in a plane perpendicular to the wind direction. This increases the velocity and density of the air flowing over the turbine blades 24. In the preferred embodiment, the shell is an inflated mylar membrane or other light-weight material with little stretch. Of course, other materials may be used, so long as the material has sufficient strength to withstand the wind load.

It is known that the aerodynamic force on the blades varies roughly as a sine function depending on the orientation of the blade relative to the air flow direction. The maximum aerodynamic force and corresponding maximum torque occurs when the blade has its leading edge pointed directly into the airflow, while the minimum aerodynamic force is when the leading edge is perpendicular to the airflow. Translated into a wind turbine of the type described herein, this means that the blade is producing maximum torque when it is rotated so that the plane containing the blade and the tower is perpendicular to the airflow. It is also known that the velocity of an airstream increases as it travels past a sphere in the airstream. The increase is greatest at the circumference of the sphere that lies in a plane perpendicular to the airflow.

In the embodiment of the present invention utilizing a stationary sphere inside the sweep of the turbine blades, these two effects are multiplied at the point in the sweep of the turbine blades where both are at their maximum, namely the point where the blade leading edge is pointed directly into the air flow. This results in the maximum possible total increase in efficiency.

What is claimed is:

1. A wind turbine, comprising
   (a) a substantially stationary vertical tower;
   (b) upper turbine blade attachment means mounted on an upper portion of said tower for rotatably attaching the upper end of a plurality of turbine blades to said upper portion of said tower;
   (c) lower turbine blade attachment means mounted on a lower portion of said tower for rotatably attaching the lower end of a plurality of turbine blades to said lower portion of said tower, the wind turbine not including any rotation rigid vertical tower that connects the upper blade attachment means to the lower blade attachment means; and
   (d) a plurality of turbine blades, the upper end being attached to said upper turbine blade attachment means and the lower ends being attached to said lower turbine blade attachment means, each of said turbine blades being curved over its length so that the middle of the turbine blades rotate about the tower spaced apart from the tower.

2. A wind turbine as in claim 1, wherein said upper turbine blade attachment means includes:
   (a) an upper turbine blade attachment flange extending around and radially from the upper portion of said tower;
   (b) an upper turbine blade connecting means having an outer circumference with a plurality of attachment brackets on the outer circumference, for connecting said plurality of turbine blades; and
   (c) bearing means attached to said upper turbine blade attachment flange and said upper turbine blade connecting means for rotatably attaching said upper turbine blade attachment flange and said upper turbine blade connecting means.

3. The wind turbine of claim 2, wherein:
   (a) said upper turbine blade connecting means includes a ring with an inner circumference and an outer circumference, said attachment brackets being on the outer circumference of said ring; and
   (b) said bearing means includes a ring-shaped inner bearing housing attached to said upper turbine blade attachment flange and having an outer circumference with an inner bearing housing bearing raceway, a ring-shaped outer bearing housing attached to said upper turbine blade connecting means and having an inner circumference with an outer bearing housing bearing raceway mating with the inner bearing housing bearing raceway, and a set of bearings engaged in said bearing raceways.

4. The wind turbine of claim 1, wherein said lower turbine blade attachment means includes:
   (a) a lower turbine blade attachment flange extending around and radially from the lower portion of said tower; and
   (b) a lower turbine blade connecting means having an outer circumference with a plurality of attachment brackets on the outer circumference, for connecting said plurality of turbine blades; and bearing means attached to said lower turbine blade attachment flange and said lower turbine blade connecting means for rotatably attaching said lower turbine blade attachment flange and said lower turbine blade connecting means.

5. The wind turbine of claim 4, wherein:
   (a) said lower turbine blade connecting means includes a ring with an inner circumference having an annular bearing raceway; and
   (b) said bearing means includes a set of bearings engaged in said annular bearing raceway.

6. The wind turbine of claim 5, wherein:
(a) said annular bearing raceway includes a first annular surface and a second annular surface diagonally disposed relative to the first annular surface; and
(b) said set of bearings includes a first group of bearings engaged with the first annular surface and a second group of bearings engaged wit the second annular surface.

7. A wind turbine, comprising:
(a) a substantially stationary vertical tower;
(b) upper turbine blade attachment means mounted on an upper portion of said tower for rotatably attaching the upper end of a plurality of turbine blades to said upper portion of said tower;
(c) lower turbine blade attachment means mounted on a lower portion of said tower for rotatably attaching the lower end of a plurality of turbine blades to said lower portion of said tower, said lower turbine blade attachment means including a lower turbine blade attachment flange extending around and radially from the lower portion of said tower with a set of bearings engaged with the flange, and a lower turbine blade connecting means having an outer circumference with a plurality of attachment brackets on the outer circumference, for connecting said plurality of turbine blades, bearing means attached to said lower turbine blade attachment flange and said lower turbine blade connecting means for rotatably attaching said lower turbine blade attachment flange and said lower turbine blade connecting means, and a ring with an inner circumference having an annular bearing raceway engaged with said bearings, the annular bearing raceway having two annular surfaces diagonally disposed relative to one another and the bearing including a first group of bearings engaged with one of the two annular surfaces and a second group of bearings engaged with the other of the two annular surfaces;
(d) a plurality of turbine blades, the upper ends being attached to said upper turbine blade attachment means and the lower ends being attached to said lower turbine blade attachment means, each of said turbine blades being curved over its length so that the middle of the turbine blades rotate about the tower spaced apart form the tower;
(e) wherein each bearing of said set of bearings is a roller bearing and each roller bearing is rotatably mounted on a bearing shaft, and each shaft is mounted to the radially outward portion of said lower turbine blade attachment flange.

8. The wind turbine of claim 1, wherein said tower has a polygonal exterior wall, access means located on the exterior wall to access the tower interior, and ascension means for ascending the tower interior.

9. The wind turbine of claim 8, further comprising a foundation to which the tower is attached, for founding the tower in the earth.

10. The wind turbine of claim 1, wherein each of said turbine blades includes an upper end portion attached to said upper turbine blade attachment means, a lower portion attached to said lower turbine blade attachment means, and a center portion between the upper and lower portions, the center portion having a cross-section with airfoil characteristics different than the airfoil characteristics of the cross-section of the upper and lower portions.

11. The wind turbine of claim 10, wherein the airfoil characteristics of said upper and lower turbine blade portions are substantially the same.

12. A wind turbine, comprising
(a) a substantially stationary vertical tower;
(b) upper turbine blade attachment means mounted on an upper portion of said tower for rotatably attaching the upper end of a plurality of turbine blades to said upper portion of said tower;
(c) lower turbine blade attachment means mounted on a lower portion of said tower for rotatably attaching the lower end of a plurality of turbine blades to said lower portion of said tower;
(d) a plurality of turbine blades, the upper ends being attached to said upper turbine blade attachment means and the lower ends being attached to said lower turbine blade attachment means, each of said turbine blades being curved over its length so that the middle of the turbine blades rotate about the tower spaced apart from the tower; and
(e) adjacent sets of braces connecting adjacent turbine blades.

13. The wind turbine of claim 12, wherein the length of said braces is adjustable so that the arc of the blades can be adjusted.

14. The wind turbine of claim 13, wherein the length adjustment of the braces is by turnbuckles.

15. The wind turbine of claim 12, wherein each said set of braces includes an upper set and a lower set connecting each pair of adjacent turbine blades, the upper set being located above the midpoint of the turbine blades and the lower set being located below the midpoint of the turbine blades.

16. The wind turbine of claim 15, wherein each of said upper and lower brace sets connecting each pair of adjacent turbine blades includes a first brace attachment bracket attached to the brace set and to one of the turbine blades of said pair of adjacent turbine blades and a second brace attachment bracket attached to the brace set and to the other turbine blade of said pair of adjacent turbine blades.

17. The wind turbine of claim 16, wherein said first and second brace attachment brackets are attached to said adjacent turbine blades by bolts extending through the turbine blades and through the brace attachment brackets for the adjacent brace set.

18. The wind turbine of claim 17, wherein said brace attachment brackets include a turbine blade receiving notch to mate with one of said turbine blades on one side of the bracket and a brace receiving slot to receive the brace set on the other side of said bracket, and two shoulders, one on each side of the slot at the juncture between the slot and the notch, said shoulders each having a hole for receiving said bolts extending through the bracket.

19. The wind turbine of claim 15, wherein said upper brace set includes a first brace with one end connected to one of said pair of adjacent turbine blades and the other end connected to a brace connecting gusset located between said pair of adjacent turbine blades, a second brace with one end connected to the same turbine blade as the first brace at an elevation below the connection of the first brace and the other end connected to said brace connecting gusset, a third brace with one end connected to a turbine blade adjacent to the turbine blade to which the first and second brace are connected at an elevation substantially the same as the connection of the first brace to its connected turbine blade and the other end connected to said brace gusset, and a fourth brace with one end connected to the same turbine blade as the third brace at an elevation substantially the same as the connection of the second brace to its connected turbine blade and the other end connected to said brace gusset.

20. The wind turbine of claim 19, wherein said lower brace set includes a first brace with one end connected to one of said pair of adjacent turbine blades and the other end connected to a brace connecting gusset located between said pair of adjacent turbine blades, a second brace with one end connected to the same turbine blade as the first brace at an elevation below the connection of the first brace and the other end connected to said brace connecting gusset, a third brace with one end connected to a turbine blade adjacent to the turbine blade to which the first and second brace are connected at an elevation substantially the same as the connection of the first brace to its connected turbine blade and the other end connected to said brace gusset, and a fourth brace with one end connected to the same turbine blade as the third brace at an elevation substantially the same as the connection of the second brace to its connected turbine blade and the other end connected to said brace gusset.

21. The wind turbine of claim 1, further comprising a shell attached to said tower to direct air flow toward the rotating blades, with the tower extending through at least one wall of said shell, the shell being positioned on the tower and dimensioned so that the rotating turbine blades sweep around the shell without impacting the shell.

22. The wind turbine of claim 20, wherein the sweep of the turbine blades substantially describes a sphere, and said shell is substantially a hollow sphere substantially concentric with the sphere described by the sweep of the turbine blades.

* * * * *